Sept. 30, 1941.   W. A. RAY   2,257,400
LEVER MECHANISM
Filed Oct. 18, 1940
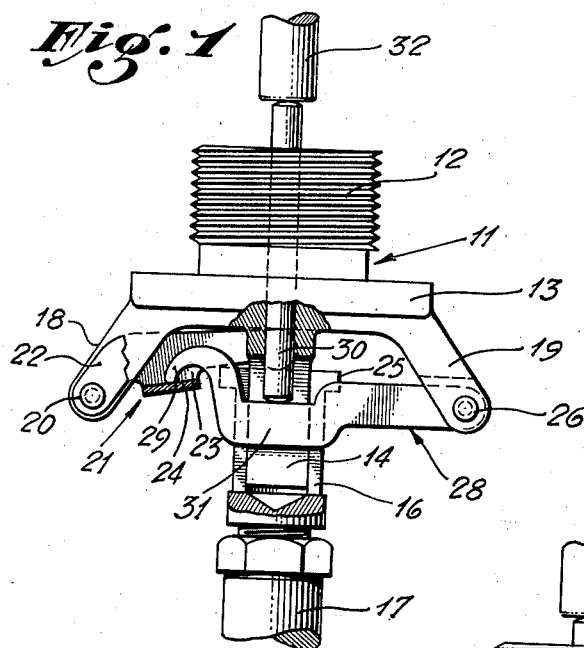
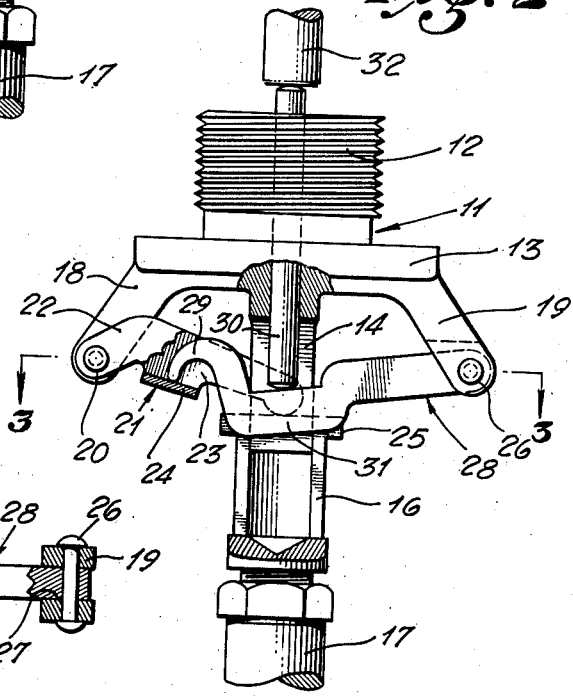
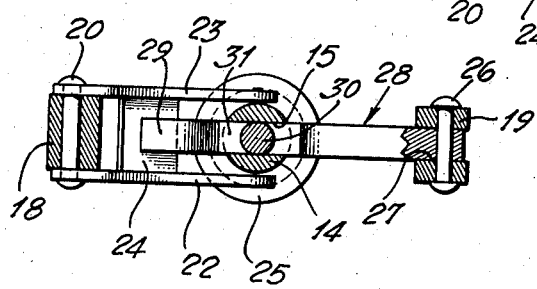
WILLIAM A. RAY,
INVENTOR;
BY John H. Rouse,
ATTORNEY.

Patented Sept. 30, 1941

2,257,400

UNITED STATES PATENT OFFICE 2,257,400

LEVER MECHANISM

William A. Ray, Glendale, Calif.

Application October 18, 1940, Serial No. 361,753

6 Claims. (Cl. 74—110)

My present invention relates to lever mechanisms and has for an object the provision of a novel mechanism for multiplying linear motion which is compact, effective, inexpensive to manufacture, and wherein the actuating and the actuated member are coaxially arranged with the lever arms substantially symmetrical about them.

Other objects and advantages of my invention will be found in the description, the drawing, and the appended claims.

For complete understanding of the invention, reference may be had to the following detailed description and accompanying drawing, wherein:

Figures 1 and 2 are like elevational views, partly in section, of a mechanism embodying my invention, showing the parts in the different positions which they assume in operation; and Figure 3 is a section taken along the line 3—3 of Fig. 2.

In the drawing, the numeral 11 indicates a generally cylindrical supporting member which is adapted to be rigidly mounted by its upper threaded portion 12 in an opening in a relatively fixed bracket or other support. Extending from the underside of the flange 13 of member 11 is a reduced cylindrical guide portion 14 which is provided, substantially throughout its length, with a slot 15 (Fig. 3). Slidable on the lower portion of the guide 14 is a sleeve 16 having a closed bottom end which is threaded for connection to a shaft 17 for a device to be operated. Extending downward at an angle from opposite sides of the flange 13, and formed integral therewith, is a pair of supporting arms 18 and 19. Pivoted by a pin 20 on the lower end of arm 18 is a first lever 21 having parallel spaced arms 22 and 23 which are joined at their lower edges by a short horizontal bridge portion 24. The free ends of these arms extend inwardly and are provided with rounded extremities which engage the upper surface of the flange 25 of sleeve 16 on opposite sides of the guide 14. Pivoted, by a pin 26, in a slot 27 formed in the lower end of the other supporting arm 19, is a second lever 28 which extends inwardly through the slot 15 in the guide and terminates in a hook portion 29, the rounded extremity of which engages the bridge 24 of the first lever. The upper portion of the sleeve 16 is also slotted, to correspond with the slot 15 of the guide, to permit passage therethrough of the second lever 28. The upper portion of the supporting member is concentrically bored for the reception of a rod 30, the lower end portion of which extends within the slot 15 and engages the depressed intermediate portion 31 of the second lever 28.

When the rod 30 is moved downward, as under the influence of an operating stem 32, the second lever is moved, thereby moving the first lever, which in turn moves the sleeve; the ratio of movement of the rod to that of the sleeve being approximately 1:5 in the example illustrated.

While I have herein shown and described a specific embodiment of my invention, I wish it to be understood that modifications may be made without departing from the spirit of the invention and that I intend therefore to be limited only by the scope of the appended claims.

I claim as my invention:

1. A lever mechanism, comprising a supporting member having a bore in the upper portion thereof and a lower elongated guide portion coaxial with said bore, said guide portion having a longitudinal slot therethrough communicating with said bore, a sleeve reciprocable on a lower portion of said guide portion, a first and a second lever arm pivoted respectively at one end on opposite sides of said supporting member, the free end of said first arm extending inwardly so as to engage said sleeve, the free end of said second arm extending inwardly through said slot and engaging said first arm between the ends thereof, and a rod reciprocable in said bore and engageable with said second arm.

2. A lever mechanism, comprising a supporting member having a bore in the upper portion thereof and a lower elongated guide portion coaxial with said bore, said guide portion having a longitudinal slot therethrough communicating with said bore, a sleeve reciprocable on a lower portion of said guide portion, a first and a second lever pivoted respectively at one end on opposite sides of said supporting member, said first lever having a pair of spaced parallel arms extending inwardly so as to engage opposite side portions of said sleeve, the free end of said second lever extending inwardly through said slot and engaging said first lever between the ends thereof, and a rod reciprocable in said bore and engageable with said second lever.

3. A lever mechanism, comprising a supporting member having a bore in the upper portion thereof and a lower elongated guide portion coaxial with said bore, said guide portion having a longitudinal slot therethrough communicating with said bore, a sleeve reciprocable on a lower portion of said guide portion, a first and a second lever pivoted respectively at one end on opposite sides of said supporting member, said first lever having a pair of spaced parallel arms extending inwardly so that the free ends of said arms engage opposite side portions of said sleeve, said first lever also having between its ends a portion joining said arms, the free end of said second lever extending inwardly through said slot and engaging said arm-joining portion, and a rod reciprocable in said bore and engageable with said second lever.

4. A lever mechanism, comprising a supporting member having a bore through the upper portion thereof and a lower elongated cylindrical guide portion coaxial with said bore, said guide portion having a longitudinal slot therethrough communicating with said bore, a sleeve reciprocable on a lower portion of said guide portion, a pair of rigid arms extending outwardly from said supporting member and on opposite sides thereof, a first lever pivoted at one end on one of said arms, a second lever pivoted at one end on the other of said arms, said first lever having a pair of spaced parallel arms extending inwardly so that the free ends of said arms engage opposite side portions of said sleeve, said first lever also having between its ends a portion joining the arms thereof, the free end of said second lever extending inwardly through said slot and engaging said arm-joining portion, and a rod reciprocable in said bore and engageable with the portion of said second lever within said slot.

5. A lever mechanism, comprising a supporting member having a bore through the upper portion thereof and a lower elongated cylindrical guide portion coaxial with said bore, said guide portion having a longitudinal slot therethrough communicating with said bore, a sleeve reciprocable on a lower portion of said guide portion, a pair of rigid arms extending outwardly from said supporting member and on opposite sides thereof, a first lever pivoted at one end on one of said arms, a second lever pivoted at one end on the other of said arms, said first lever having a pair of spaced parallel arms extending inwardly so that the free ends of said arms straddle said guide portion and engage the upper surface of said sleeve, said first lever also having between its ends a portion joining the arms thereof, the free end of said second lever extending inwardly through said slot and engaging said arm-joining portion, and a rod reciprocable in said bore and engageable with the portion of said second lever within said slot.

6. A lever mechanism, comprising a supporting member having a bore through the upper portion thereof and a lower elongated cylindrical guide portion coaxial with said bore, said guide portion having a longitudinal slot therethrough communicating with said bore, a sleeve reciprocable on a lower portion of said guide portion and having a slot through its upper end portion coinciding with the slot in said guide portion, a pair of integrally formed arms extending outwardly from said upper portion of the supporting member and on opposite sides thereof, a first lever pivoted at one end on one of said arms, a second lever pivoted at one end on the other of said arms, said first lever having a pair of spaced arms extending inwardly so that the free ends of said arms straddle said guide portion and engage the upper surface of said sleeve, said first lever also having between its ends a portion joining the arms thereof, the free end of said second lever extending inwardly through said slots and engaging said arm-joining portion, and a rod reciprocable in said bore and engageable with the portion of said second lever within said slots.

WILLIAM A. RAY.